July 26, 1955 E. NATHAN Re. 24,046

SWITCH MOUNTING

Original Filed Feb. 28, 1948

INVENTOR.
EDWARD NATHAN

BY

ATTORNEY

United States Patent Office

Re. 24,046

Reissued July 26, 1955

24,046

SWITCH MOUNTING

Edward Nathan, New York, N. Y., assignor, by mesne assignments, to Lectra Products Company, New York, N. Y.

Original No. 2,651,281, dated September 8, 1953, Serial No. 12,110, February 28, 1948. Application for reissue July 29, 1954, Serial No. 446,693

10 Claims. (Cl. 116—133)

Matter enclosed in heavy brackets [ ] appears in the original patent but forms no part of this reissue specification; matter printed in italics indicates the additions made by reissue.

This invention relates to a control means such as a knob for regulating instruments mounted on a panel or the like and more particularly to a knob and its associated means for indicating selected positions of the control means.

In the mounting of instrument controls on the dash of an automobile, where indicating the control is provided with indicia for indicating one of several positions, it is desirable to position the indicia in a predetermined location with respect to the control so that it always occupies that position when the instrument is mounted and securely held in position by assembly of the control means.

It is an object of the present invention to provide a knob assembly which is adapted to not only serve as a control for the instrument but to secure the instrument to a support such as an instrument panel.

Another object of the invention is to provide a unitary control member and a securing means for the instrument which may be readily applied to the instrument for holding it in a predetermined position.

A further object of the invention is to provide a securing means for the instrument which has a portion thereof movable relative to another portion whereby the latter may be adjusted to a predetermined position with respect to the control means for the instrument.

Other objects and advantages of the invention will more fully appear from the following description taken in connection with the accompanying drawings in which.

Figure 1:
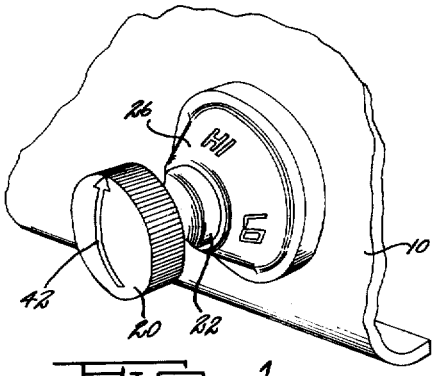
Fig. 1 is a perspective view of a control means for a switch.

The invention has been illustrated as applied to control members for automobile instruments usually mounted on the instrument panel of an automobile. However, it is applicable to other forms of controls and other mountings.

Instrument controls such as switches, mixture regulators, or position indicators are usually provided with indicia for indicating the position of the control setting and it is desirable to mount the control in a predetermined position with respect to the instrument control means so that it always appears in the same location regardless of the position of the securing means for the instrument.

In the drawings I have shown an instrument panel 10, having a switch 12 positioned on the rear face of the panel 10. The switch is provided with an externally threaded sleeve 14 which fits through an opening 16 in the instrument panel 10. Heretofore it has been customary to secure the switch 12 to the panel 10 by a nut applied to the sleeve 14 and tightening the nut against the front face of the panel 10.

The switch 12 is usually provided with a control shaft 18 projecting forwardly through the sleeve 14 for operating the switch. A knob is applied to the shaft 18 after the means are employed on the panel for denoting the "on," "off," "high" or "low" positions of the switch, or the name of the instrument applied thereon, it is necessary to accurately position the switch with reference to the indicia.

Figure 2:
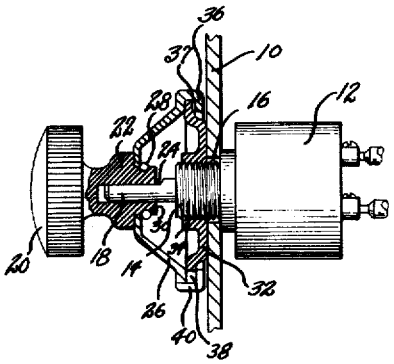
Fig. 2 is a side view of an instrument mounting with the instrument panel securing means, and a portion of the knob in section.

Referring specifically to Fig. 2, I have shown a knob having a shank 22 provided with a central recess opening from its rear side for the reception of the shaft 18 which is non-rotatably but axially slidably engaging the recess, there being a flattened portion 24 on the outer periphery of the shaft 18.

Mounted on the outer periphery of the shank 22 is a hollow shell 26 which is rotatable relative to the shank 22. The rear free end of the shell 26 is flared outwardly at its outer periphery of an end wall 32. The end wall 32 is provided with a threaded aperture 34 for reception on the threaded sleeve 14 of the switch 12. The crimped over portion 36 of the outer edge of the shell 26 is tight enough to normally retain the end wall 32 against free relative rotation therewith but is free enough to permit relative rotation when the end wall is held against turning and the shell rotated. If desired, a friction material 37 may be inserted between the overlapping surfaces of the end wall 32 and the shell.

Radially aligned notches 38 and 40 are formed in the outer periphery respectively of the end wall 32 and the outer end of the shell 26 to receive a tool for rotating both members in a direction for screwthreading the end wall 32 on the sleeve 14 when the latter is positioned in the opening 16 in the instrument panel 10.

The outer periphery of the end wall 32 is forwardly offset a distance greater than the wall thickness of the shell 26 so that the rear surface of the crimped over portion 36 does not contact the instrument panel, tending to scratch the instrument panel surface during assembly.

As illustrated in Fig. 1 the outer surface of the shell 26 is provided with indicia such as "High," "Lo," and "Off," or the name (on the back side not shown.) The knob 20 is provided with an arrow 42 for indicating the position of the knob with respect to the shell 26

The knob 20, shell 26, and end wall 32 comprise a unitary assembly adapted to be applied to the switch for operating the same and for securing the switch in position on the instrument panel.

When the switch 12 and the control knob 20 are assembled, the sleeve 14 from one side of the instrument panel is inserted through an opening in the instrument panel and the knob is placed over the shank 22 and slid forwardly and the threaded opening 34 is then screwthreaded on the sleeve 14, from the opposite side of the panel, by inserting a tool in the notches 38 and 40 and turning the shell 26 and the end wall 32. This draws the switch 12 toward the back face of the instrument panel and the wall 32 toward the front face of the panel whereby the switch is securely held in position. After the wall 32 has been tightened against the front face of the panel 10, the tool is withdrawn from the notch 38 so that it engages only the notch 40. The shell is then turned to a position for properly locating the indicia, the shell 26 turning relative to the back wall 32 and the knob 20.

Figure 3:
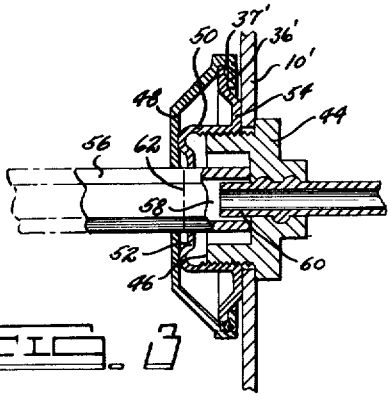
Fig. 3 is a cross sectional view of a modified form of securing means showing a tool for applying the securing means.
Figure 4:
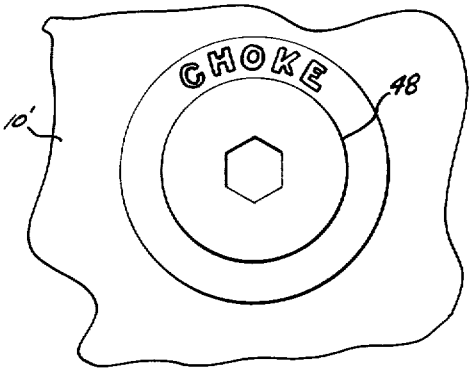
Fig. 4 is a front face view of Fig. 3.

In the form of the invention illustrated in Figs. 3 and 4, the invention has been shown as applied to a mounting for a "push," "pull" control such as a choke control. A shouldered member 44, having a threaded sleeve 46 is adapted to be received on the backside of the instrument panel 10' with the sleeve 46 extending through an opening in the panel. The retainer comprises a two piece member, an outer shell 48 and an internally threaded wall 50 which is cup shaped, having a front wall 52 and a back wall 54. The outer periphery of the shell 48 is turned over the outer periphery of the back wall 54 with sufficient force to normally hold it against relative rotation with respect to the back wall 54 but which may be turned relative thereto when the back wall is held against rotation.

The front wall 52 and the front face of the shell 48 are provided with aligned apertures, preferably angular in shape as hexagonal, for the reception of a tool 56 correspondingly shaped. The tube is shown having an open end 60 which is part of the choke assembly, the choke handle and cable being removed and not shown.

In this form of the invention, the assembled shell 48, and the back wall 54 are threaded onto the sleeve 46 by turning the tool 56 which fits the opening in the shell 48 and front wall 52. The back wall 54 is brought into tight engagement with the front face of the instrument panel 10' for securely holding the member 44 in position. After the parts tightly engage the panel 10' the tool 56 is partly withdrawn, as indicated by the dotted lines 62, where it only engages the edge of the opening in the front face of the shell 48. The tool is then turned, rotating the shell 48 relative to the back wall 54 against the frictional resistance between the two members at their outer periphery. This properly positions the indicia, "choke," shown on page 4.

Figure 5:
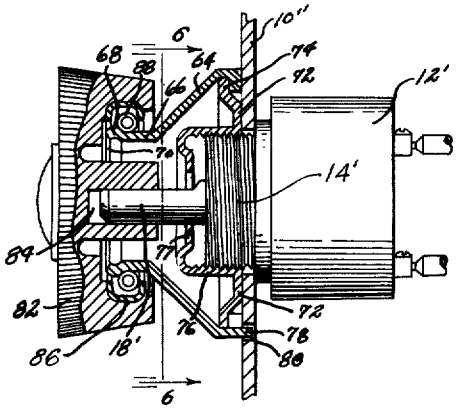
Fig. 5 is a view corresponding to Fig. 2, but showing a further modification of the securing means.
Figure 6:
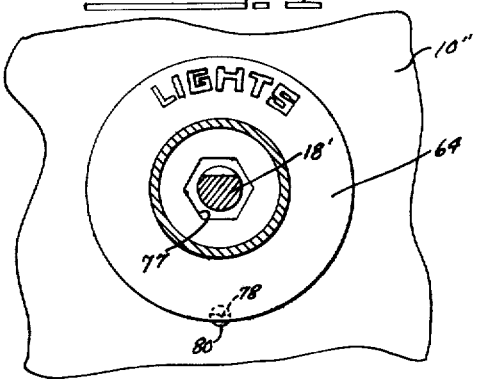
Fig. 6 is a sectional view taken on line 6—6 of Fig. 5.

The form shown in Figs. 5 and 6 has the front face of the shell 64 provided with a forwardly extending sleeve 66, the outer end of which is provided with an outwardly extending shoulder 68 and the outer end is open as at 70. The threaded member 72 is provided with a radially extending flange 74 and an axially extending flange 76 which is internally threaded for engagement with the externally threaded portion 14' of the instrument 12'. The outer open end of the flange 76 is angularly formed as at 77 for receiving a tool such as disclosed in Fig. 3 for turning the threaded member 72 on the threaded portion 14', the tool being inserted through the opening 70 in the outer end of the sleeve 66.

The shell is secured to the outer periphery of the flange 74 and is provided with a rearwardly projecting tab 78 adapted to be received in an opening 80 in the instrument panel 10''. In this form of the invention the shell 64 is positioned on the instrument panel by locating the tab 78 in the opening 80 and then turning the threaded member 72 into tight engagement with the instrument panel by a tool not shown, fitting the angularly shaped opening 77. The threaded member 72 is relatively movable angularly with respect to the shell 64, the latter being held against rotation by the tab 78.

The knob 82 is provided with an opening 84 of non-circular cross section which is slidingly received on the control shaft 18'. The knob is further provided with an annular groove 86 which carries a garter spring 88 adapted to be pressed over the shoulder 68 when assembled; the spring 88 serving as a releasable key for holding the knob in operative position, yet permitting removal thereof without mutilating any of the parts.

In all the forms of the invention it will be noted that I have provided a unitary assembly which may be used to retain an instrument mounting to a support and which may be readily indexed to any desired position for locating indicia thereon. The invention is applicable to rotary or longitudinally movable controls. The knob, carried by the securing means which is relatively rotatable therewith permits assembly in a single operation and yet provides adjustability between the mechanism and the indicia.

It will be understood that various changes including the size, shape and arrangement of parts may be made without departing from the spirit of my invention and it is not my intention to limit its scope other than by the terms of the appended claims.

I claim:

1. An instrument mounting and control device for an instrument comprising a shank having a portion of non-circular cross section, a knob body having a central recess non-rotatably slidable over the non-circular portion of the shank, a shell carried by said knob having an indicia thereon and rotatable relative to said knob, a threaded member carried by said shell and forcibly rotatable relative to said shell, and means for rotating said threaded member and said shell in unison.

2. A knob structure comprising a knob proper having a central recess for reception on a shank which is non-rotatable but axially slidable therewith, a hollow shell carried by said knob and rotatable relative thereto, a threaded member carried by said shell, the outer periphery of said shell being crimped around the outer periphery of said threaded member into normally holding engagement but forcibly movable relative thereto in an angular direction, said shell and threaded member having tool receiving means for the reception of a tool for engagement with both members or only one of said members.

3. An instrument mounting and control device for an instrument comprising, a shank having a portion of non-circular cross section, a knob body having a central recess non-rotatably slidable over the non-circular portion of the shank, a threaded member for securing an instrument to a support, a shell rotatably carried by said threaded member, positioning means carried by said shell for angularly positioning said shell relative to said threaded member, and snap fastening means cooperating between said knob and said shell for releasably securing said knob to said shell.

4. An instrument mounting and control device for an instrument comprising, a forwardly projecting shank on the instrument, an internally threaded member surrounding said shank shaving screw threaded engagement with a body of the instrument for securing the latter to the support, a shell surrounding said threaded member frictionally carried by said threaded member, means for adjusting the relative angular position of said shell relative to the said threaded member, and a knob for turning said shank rotatably carried by said shell.

5. A combined knob and securing means for an instrument comprising, a threaded member for securing the instrument to a support, a knob proper for manipulating the instrument, and a shell connecting said threaded member and said knob, said shell being angularly movable relative to said member and said knob, and said knob having a snap-on fit with said shell.

*6. A device of the class described comprising an instrument including a threaded portion for insertion through an opening in a support, a threaded holding member engaging said threaded portion of said instrument tightly securing said instrument to said support, and a shell carried by said holding member rotatably relative thereto, said shell including means engaging said support for indexing the same to said support simultaneously with fixing said instrument to said support.*

*7. A device of the class described comprising an instrument including a threaded portion for insertion through an opening in a support, a threaded holding member engaging said threaded portion of said instrument tightly securing said instrument to said support, and a shell including an inturned peripheral lip at the base thereof carried by said holding member, said holding member being formed to engage said shell lip and retain it in fixed relationship in respect to said support responsive to the securing of said instrument to said support.*

*8. A device of the class described comprising an instrument element having a threaded portion disposed through an opening therefor in a support, a threaded holding member threaded on said instrument element securing said instrument to said support, a shell positioned*

*over said holding member, said shell and said holding member including mated elements normally retaining the said shell and holding member in axial alignment with the said shell turnable in respect to said holding member, said shell and said holding member having aligned apertures therein to accommodate a tool for turning said shell and said holding member simultaneously on or said shell independent of said holding member.*

*9. A device of the class described comprising an instrument element having a threaded portion disposed through an opening therefor in a support, a threaded holding member threaded on said instrument element securing said instrument element to said support, a shell positioned over said holding member, said shell and said holding member including mated elements normally retaining the shell and holding member in axial alignment with the said shell turnable in respect to said holding member, said holding member engaging said shell and holding it in non-rotatable relationship with respect to said support responsive to the securing of said instrument to said support.*

*10. A device of the class described comprising an instrument element having a threaded portion disposed through an opening therefor in a support, a threaded holding member threaded on said instrument element securing said instrument element to said support, a shell*

*positioned over said holding member, said shell and said holding member including mated elements normally retaining the shell and holding member in axial alignment with the said shell turnable in respect to said holding member, said holding member engaging said shell and holding it in non-rotatable relationship with respect to said support responsive to the securing of said instrument to said support, said shell including means for retaining the shell in selected indexed relationship to said support, said shell and said threaded holding members having aligned apertures therein to accommodate a tool for engaging and turning said threaded holding member.*

References Cited in the file of this patent or the original patent

UNITED STATES PATENTS

| | | |
|---|---|---|
| 1,449,725 | Beckert | Mar. 27, 1923 |
| 1,588,474 | Kent | June 15, 1926 |
| 1,751,560 | Shapiro | Mar. 25, 1930 |
| 2,005,792 | Leins | June 25, 1935 |
| 2,117,074 | Young | May 10, 1938 |
| 2,136,160 | Timmerman | Nov. 8, 1938 |
| 2,145,160 | Douglas | Jan. 24, 1939 |
| 2,223,673 | Catron et al. | Dec. 3, 1940 |
| 2,438,045 | Gerhardt | Mar. 16, 1948 |